United States Patent [19]
Horiuchi et al.

[11] Patent Number: 5,517,583
[45] Date of Patent: May 14, 1996

[54] IMAGE ENCODING METHOD AND APPARATUS

[75] Inventors: Izuru Horiuchi, Machida; Taku Yamagami, Yokohama; Shigeru Jinnai, Kawasaki, all of Japan

[73] Assignee: Canon Kabushiki Kaisha, Tokyo, Japan

[21] Appl. No.: 431,462

[22] Filed: May 1, 1995

Related U.S. Application Data

[63] Continuation of Ser. No. 978,169, Nov. 17, 1992, abandoned, which is a continuation of Ser. No. 669,655, Mar. 14, 1991, abandoned.

[30] Foreign Application Priority Data

Mar. 16, 1990 [JP] Japan ................... 2-066105

[51] Int. Cl.$^6$ .................................................. G06K 9/36
[52] U.S. Cl. ........................................... 382/239; 358/430
[58] Field of Search ........................... 382/239, 238, 382/248, 232; 348/384, 404; 358/261.2, 426, 430, 433, 466; H04N 1/417, 7/12

[56] References Cited

U.S. PATENT DOCUMENTS

| | | | |
|---|---|---|---|
| 4,386,366 | 5/1983 | Mori | 358/430 |
| 4,677,479 | 6/1987 | Hatori et al. | 382/50 |
| 4,755,878 | 7/1988 | Nakayama et al. | 358/136 |
| 4,816,914 | 3/1989 | Ericsson | 358/133 |
| 4,885,636 | 12/1989 | Sullivan | 358/133 |
| 4,916,537 | 4/1990 | Nakayama et al. | 358/133 |
| 4,920,426 | 4/1990 | Hatori et al. | 358/430 |
| 4,922,273 | 5/1990 | Yonekawa et al. | 382/56 |
| 4,947,448 | 8/1990 | Nakayama et al. | 382/56 |
| 4,954,892 | 9/1990 | Asai et al. | 358/133 |
| 4,984,076 | 1/1991 | Watanabe et al. | 358/133 |
| 5,025,482 | 6/1991 | Murakami et al. | 382/56 |
| 5,051,840 | 9/1991 | Watanabe et al. | 358/433 |
| 5,073,821 | 12/1991 | Juri | 358/133 |
| 5,121,216 | 6/1992 | Chen et al. | 382/56 |

OTHER PUBLICATIONS

"A Motion Picture Coding Algorithm Using Adaptive DCT Encoding Based On Coefficient Power Distribution Classification", by Kato, et al., IEEE Journal On Selected Areas In Communications, vol. 5, No. 7, Aug. 1987, pp. 1090–1099.
"Adaptive Cosine Transform Coding Of Images In Perceptual Domain", by Ngan, et al., IEEE Transactions On Acoustics, Speech, And Signal Processing, vol. 37, No. 11, Nov. 1989, pp. 1743–1749.
"Farbeinzelbildubertragung Im Ison", Ant Nachrichtentechnische Berichte, No. 4, May 1987, pp. 26–31.

*Primary Examiner*—Joseph Mancuso
*Attorney, Agent, or Firm*—Fitzpatrick, Cella, Harper & Scinto

[57] ABSTRACT

This invention relates to an image encoding method and apparatus and, more particularly, to determination of an encoding parameter.

According to this invention, a method of determining a parameter for encoding an image to be encoded in accordance with an encoding parameter of the already encoded image is disclosed.

34 Claims, 7 Drawing Sheets

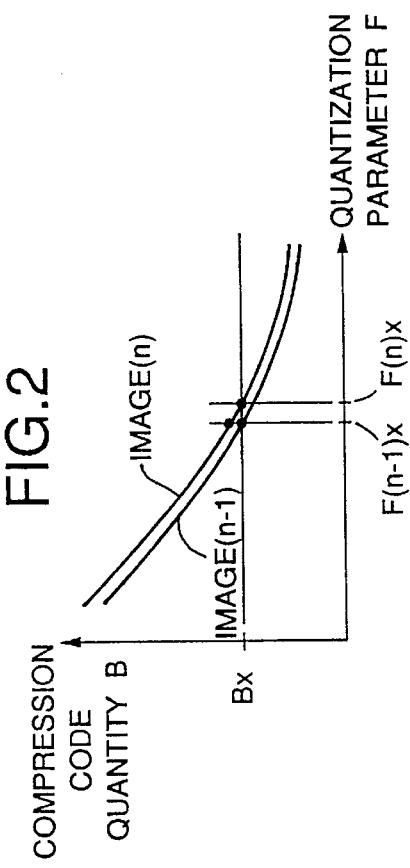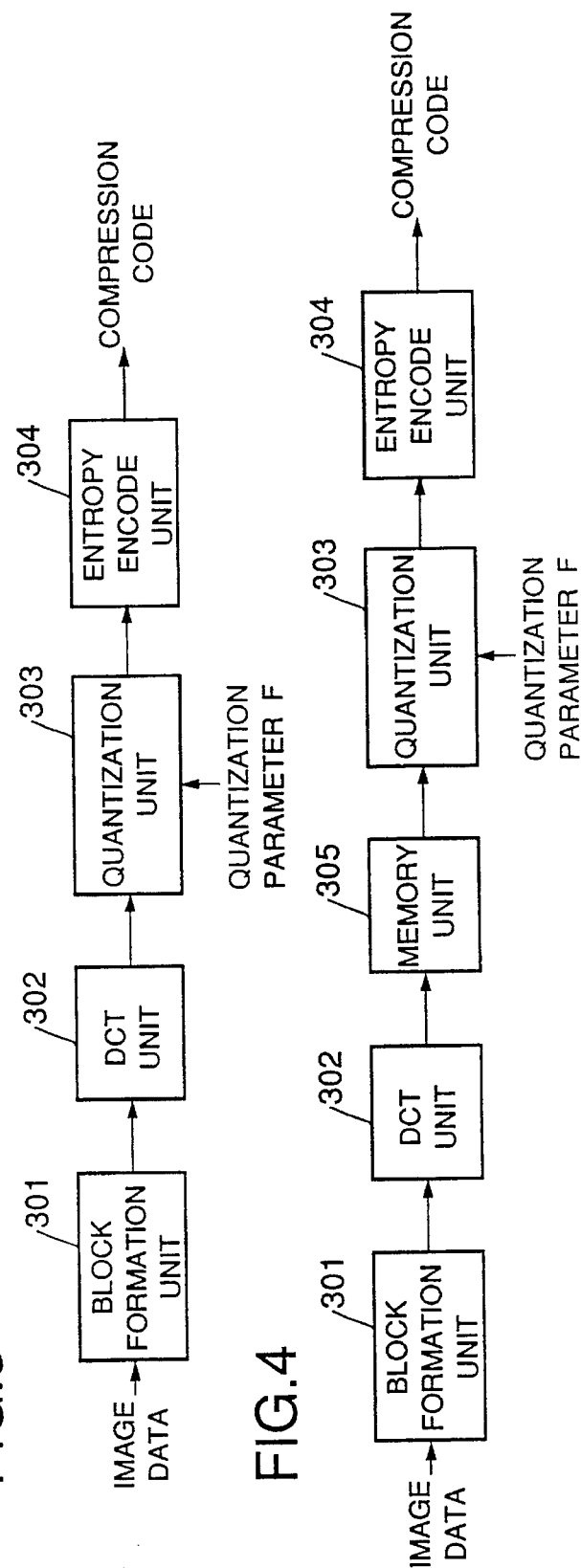

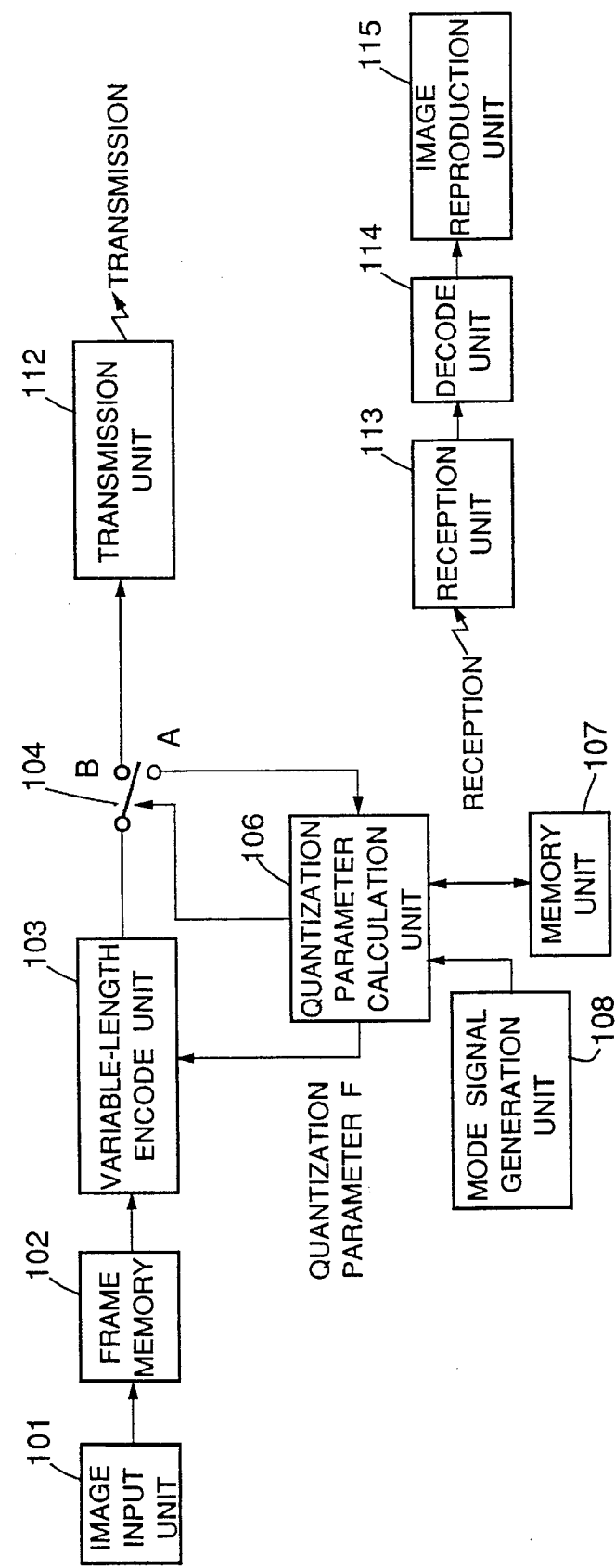

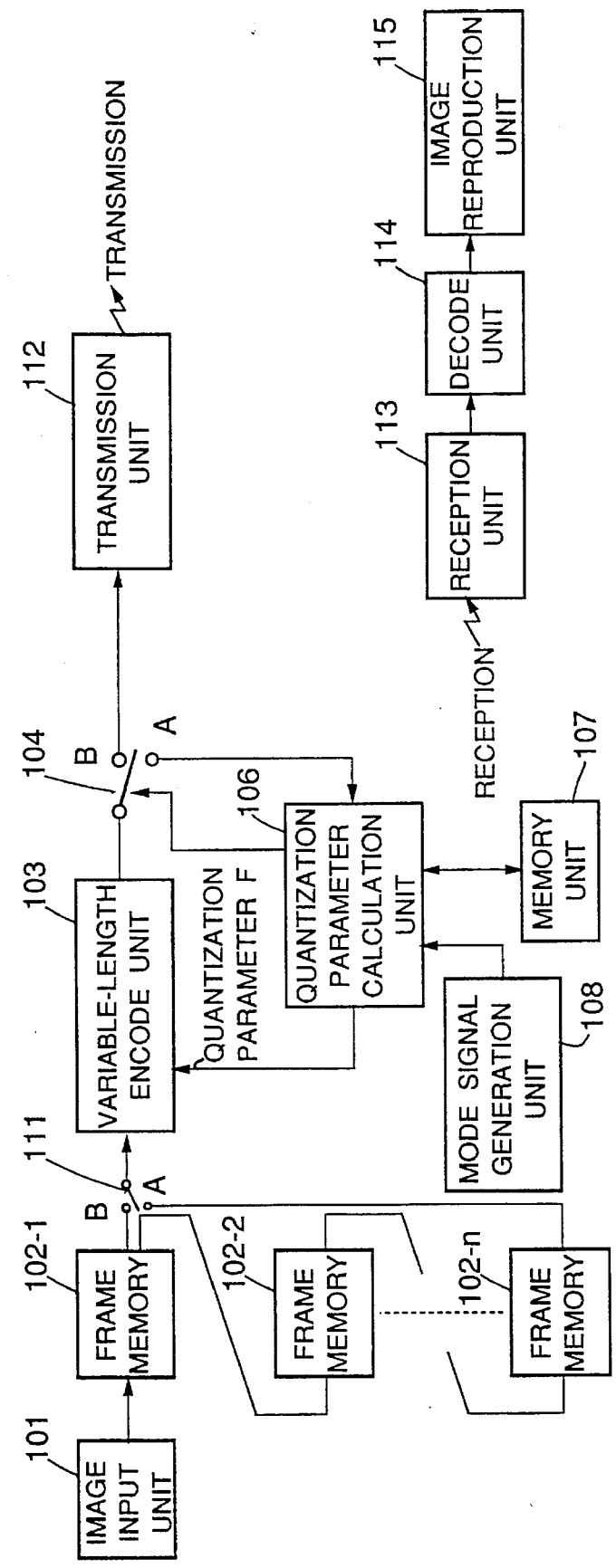

5,517,583

IMAGE ENCODING METHOD AND APPARATUS

This application is a continuation-in-part continuation of application Ser. No. 07/978,169 filed Nov. 17, 1992, now abandoned, which was a continuation of application Ser. No. 07/669,655 filed Mar. 14, 1991, now abandoned.

BACKGROUND OF THE INVENTION

1. Field of the Invention

The present invention relates to an image encoding method of encoding image data to obtain a predetermined code quantity and, more particularly, to a method which is suitably applied to a solid-state electronic still camera, an image communication, and the like.

2. Related Background Art

Conventionally, as one of compression encoding methods, variable-length encoding which varies the quantity of encoded data depending on image data is known. For example, an ADCT (Adaptive Discrete Cosine Transform) method examined by the so-called JPEG (Joint Photographic Expert Group) is known.

This encoding method requires a technique for changing a quantization parameter to converge a code quantity to a predetermined value.

However, when a plurality of images are input, a correlation of these images is not utilized to set a quantization parameter. For this reason, when a continuous photographing mode is set in, e.g., a solid-state electronic still camera, an arithmetic operation for setting a quantization parameter for one frame requires much time, and a continuous photographing speed is limited.

A technique for dividing one frame of a dynamic image to be transmitted into a plurality of blocks, changing a sampling density in units of blocks in accordance with a correlation among frames, and transmitting the image is proposed in U.S. Pat. Nos. 4,947,448, 4,755,878, and 4,916,537.

However, with the above-mentioned technique, there is room for improvement about a compression ratio of an image.

SUMMARY OF THE INVENTION

It is an object of the present invention to provide an image encoding method and apparatus, which can eliminate the conventional drawbacks, and can obtain a compression code having a predetermined code quantity at high speed.

In order to achieve the above object, according to the present invention, there is disclosed an image encoding method comprising the steps of: successively inputting images of a plurality of frames; encoding the input images; and controlling a parameter in encoding in units of frames, and wherein the parameter is determined in accordance with a parameter for encoding a frame input before a frame to be encoded.

There is also disclosed an image encoding method comprising the steps of: orthogonal-transforming an input image in units of blocks each consisting of a plurality of pixels; and quantizing transform coefficients obtained by the orthogonal transform in accordance with a quantization condition of an already quantized image.

It is another object of the present invention to provide an image encoding apparatus suitable for a still video camera.

In order to achieve the above object, according to the present invention, there is disclosed a still video camera comprising: input means for inputting a plurality of images at predetermined intervals; encoding means for sequentially encoding the plurality of images input by the input means; and control means for determining an encoding parameter of the encoding means in accordance with an image input before an image to be encoded.

It is still another object of the present invention to provide an image encoding apparatus having various functions.

In order to achieve the above object, according to the present invention, there is disclosed an image encoding apparatus comprising: encoding means for encoding an input image; and selecting means for selecting a first mode for determining an encoding parameter on the basis of a predetermined value, and a second mode for determining an encoding parameter on the basis of a parameter in previous encoding.

Other objects and arrangements of the present invention will become apparent from the following description taken in conjunction with the accompanying drawings and the appended claims.

BRIEF DESCRIPTION OF THE DRAWINGS

FIG. 2 is a graph for explaining the principle of setting a quantization parameter according to the present invention;

FIG. 3 is a block diagram showing an arrangement of a variable-length encode unit according to the present invention;

FIG. 4 is a block diagram showing an arrangement of the third embodiment of the present invention;

FIG. 9 is a block diagram showing an arrangement of the fifth embodiment of the present invention; and FIG. 10 is a block diagram showing an arrangement of the sixth embodiment of the present invention;

DETAILED DESCRIPTION OF THE PREFERRED EMBODIMENTS

<First Embodiment>

Figure 1:
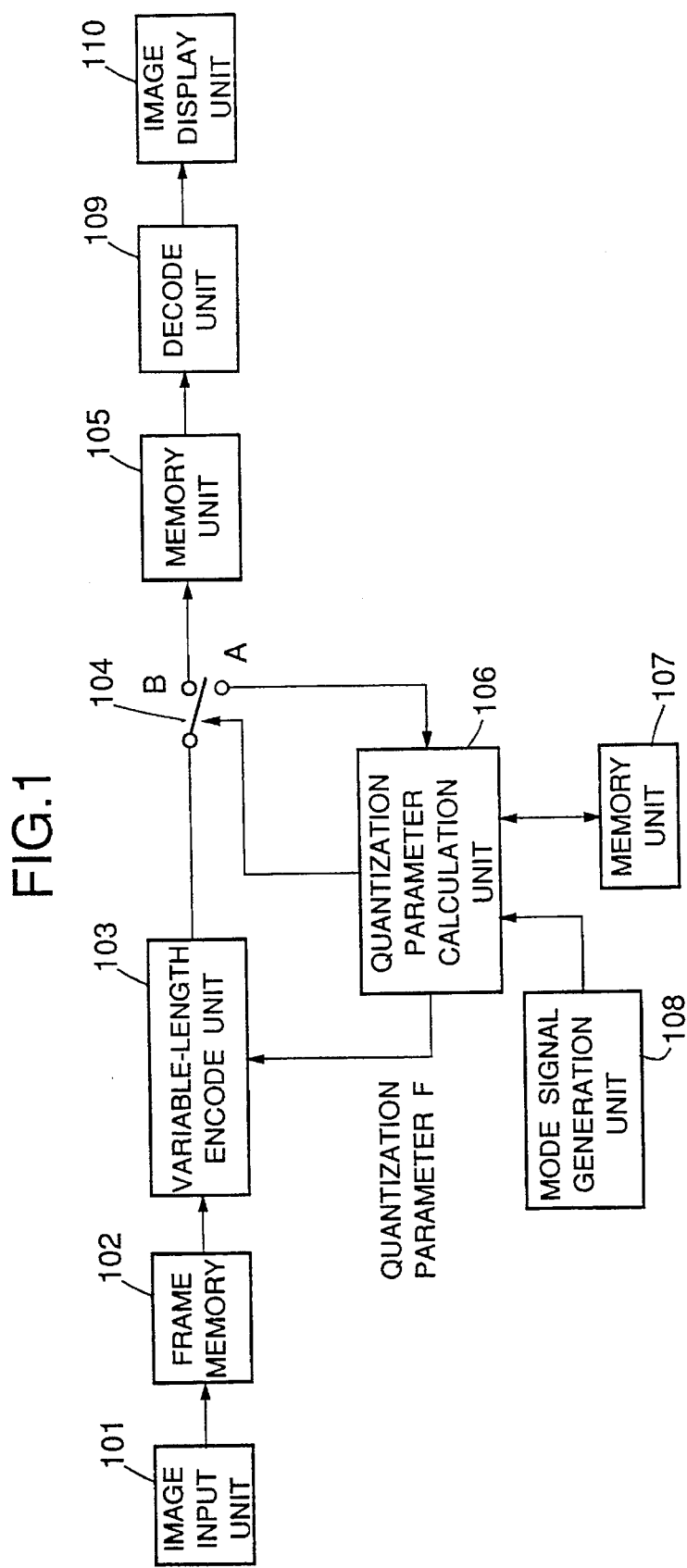
FIG. 1 is a block diagram showing the overall arrangement of the first embodiment of the present invention.

FIG. 1 is a view for explaining the first embodiment of the present invention.

In FIG. 1, an image input unit 101 comprises a CCD line sensor, an area sensor, an input interface for a computer, and the like, and is connected to a frame memory 102 for storing one frame of an input image. The frame memory 102 is connected to a variable-length encode unit 103 for performing variable-length encoding. The unit 103 is connected to a selector 104 for selecting a destination of encoded data. The selector 104 is connected to a memory unit 105 for storing encoded data. The selector 104 is also connected to a quantization parameter calculation unit 106 for calculating a quantization parameter for the encode unit 103. The unit 106 is connected to a memory unit 107 for storing a quantization parameter of a previous frame, and a mode signal generation unit 108 for setting a continuous photographing mode, and the like, and generating a mode signal. The memory unit 105 is connected to a decode unit 109 for decoding the encoded data stored in the memory unit 105. The decode unit 109 is connected to an image display unit 110 for displaying the decoded image data using, e.g., a display.

Image data of one frame input from the image input unit 101 is stored in the frame memory 102. The variable-length encode unit 103 reads out image data from the frame memory 102, and encodes it. In this case, since the image data encoded by the encode unit 103 does not always have a predetermined code length, when a fixed length code is to be finally obtained, a quantization parameter F of the encode unit 103 must be set to be an appropriate value. The quantization parameter calculation unit 106 calculates the quantization parameter F.

More specifically, the quantization parameter calculation unit 106 connects the selector 104 to an A-side to sequentially perform encoding operations using different quantization parameters F until the code quantity is converged to a predetermined value. When the code quantity is converged, the unit 106 connects the selector 104 to a B-side. Encoding is performed again in the variable-length encode unit 103 using a value Fa of the quantization parameter F at that time. The parameter Fa is stored in the memory unit 105 together with encoded data output from the encode unit 103.

As a result, data encoded into a predetermined code quantity is output to an output terminal.

The variable-length encode unit 103 will be described below with reference to FIG. 3. Image data input to the variable-length encode unit 103 is divided into blocks each consisting of 8×8 pixels by a block formation unit 301. Data of each block are subjected to DCT (discrete cosine transform) by a DCT unit 302, thus obtaining 8×8 transform coefficients. The transform coefficients are quantized by a quantization unit 303. In this case, the coarseness of quantization can be adjusted based on the quantization parameter F. When the quantization parameter F is adjusted, a code length can be adjusted. The quantized transform coefficients are converted into variable-length codes by an entropy encode unit 304 in accordance with entropy encoding such as Huffman encoding, MH encoding, MR encoding, arithmetic encoding, or the like, and are output as compression codes.

Figure 6:
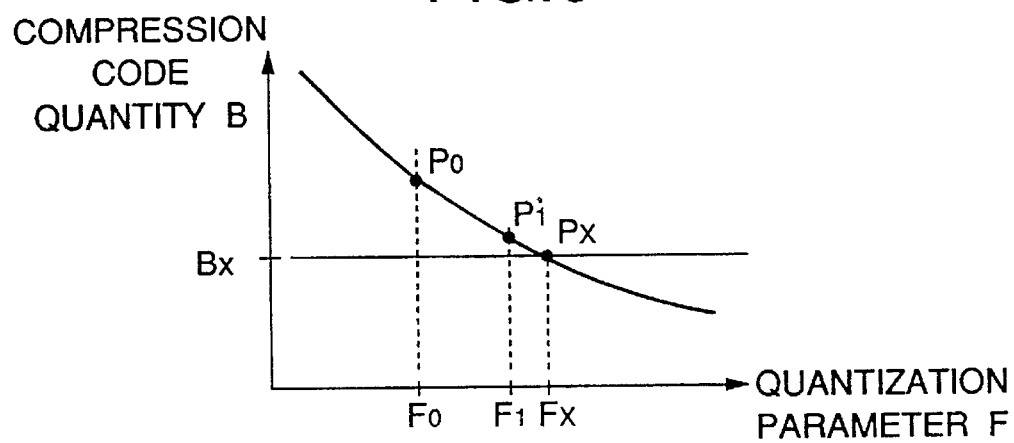
FIGS. 6 and 7 are graphs for explaining the principle of setting a quantization parameter according to the present invention.

When the value of the quantization parameter F is increased, quantization is performed by coarse quantization steps, an information quantity (redundancy) is decreased, and a compression code quantity is decreased. In contrast to this, when the value F is decreased, quantization is performed by fine quantization steps, an information quantity (redundancy) is increased, and a compression code quantity is increased. FIG. 6 is a graph showing the relationship between the quantization parameter F and a compression code quantity B. Although this curve varies depending on each image, it can be commonly expressed by a monotonous decrease function. Thus, the ADCT method of the JPEG adopts the Newton-Raphson method to obtain a value $F_x$ for defining a setup code quantity $B_x$ by repetition processing. The value F is adjusted by a quantization parameter calculation unit 303 shown in FIG. 4 so as to converge a compression code quantity B to $B_x$.

When encoding is repeated, an initial value of a quantization parameter is defined by a predetermined value $F_0$ regardless of images. For example, in an image having an F-B curve shown in FIG. 6, a quantization parameter is converged from the initial value $F_0$ to $F_1$ and $F_x$ in turn.

However, since the initial parameter $F_0$ of the quantization parameter in repetitive encoding is set to be a constant value regardless of images, the number of times of repetitions until a code quantity is converged to the setup code quantity $B_x$ becomes very large in some images. More specifically, as shown in FIG. 7, images normally have different curves representing the relationship between the quantization parameter F and the compression code quantity B.

Figure 7:
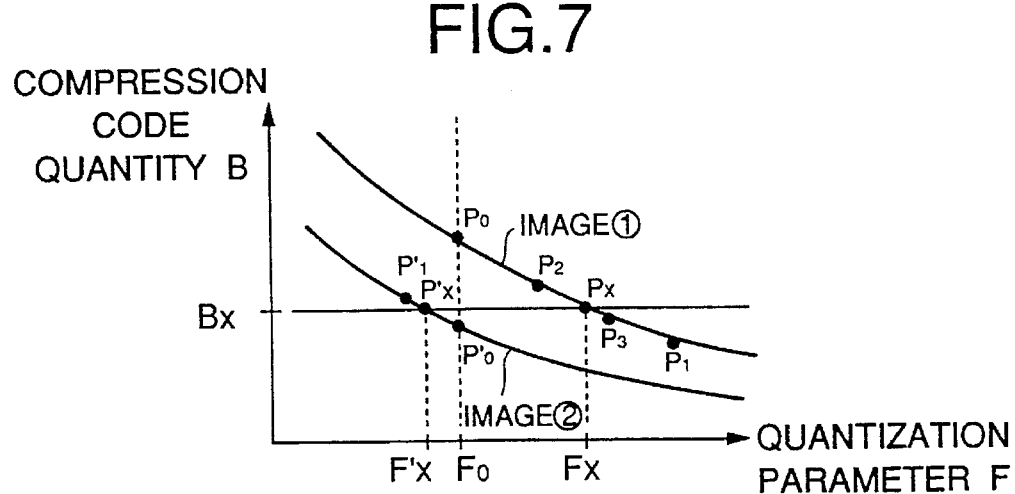

For example, in FIG. 7, quantization parameters for defining setup code quantities $B_x$ of images ① and ②. are respectively represented by $F_x$ and $F_x'$, and an error of the initial value $F_0$ of the image ① is larger than that of the image ②. For this reason, the image ①. requires extra repetitions.

When the present invention is applied to image compression of a solid-state electronic still camera, a high-speed continuous photographing operation (e.g., 10 frames/sec) requires compression within a short period of time. However, in the above-mentioned circumstances, it is very difficult to attain the high-speed continuous photographing operation in consideration of an arithmetic speed of existing ICs.

The present invention can solve this problem on the basis of the concept described below. More specifically, when a plurality of images are to be photographed using a given photographing means, a photographed image, and images photographed before and after it usually include a similar background, and a similar object. Therefore, since the information quantity of the image is almost equal to those of images photographed before and after the image, it can be expected that the F-B curves representing the relationship between the quantization parameter and the compression code quantity may be similar to each other.

Especially, in a continuous photographing mode of a solid-state electronic still camera, this tendency is outstanding. For example, in the continuous photographing mode, as shown in FIG. 2, if (n−1)th and n-th photographed images have similar F-B curves, quantization parameters for defining the setup code quantity $B_x$ have close values like $F_{(n-1)x}$ and $F_{(n)x}$. Therefore, if a quantization parameter $F_{(n-1)}$ for defining the setup code quantity in encoding of the (n−1)th image is used as an initial value for obtaining a quantization parameter in encoding of the n-th image, the number of times of repetitions of encoding for determining the quantization parameter can be decreased.

According to the present invention, an initial value $F_n$ of the quantization parameter in encoding of the n-th image is determined by using the quantization parameter $F_{(n-1)}$ (using in encoding of (n−1)th image) or with reference to it. With this method, a code quantity can be converged to a target code quantity by a small number of times of repetitions of encoding.

The algorithm and the arrangement for realizing the algorithm will be described below.

The previous image quantization parameter memory unit 107 stores a quantization parameter for defining a setup code quantity $F_{(n-1)}$ of a previously encoded image, and comprises, e.g., a RAM. An initial value $F_{(n)0}$ of a quantization parameter of an n-th image is determined by the quantization parameter calculation unit 106 with reference to a value $F_{(n-1)x}$ stored in the previous image quantization parameter memory unit 107. A calculation method of this embodiment can be selected from three modes A, B, and C, which are given by the following equations:

A: $F_{(n)0} = F_{(n-1)x}$

B: $F_{(n)0} = (F_{n-1)x} + F_0)/2$

C: $F_{(n)0} = F_0$ (where $F_0$ is a constant which is stored in advance as a default value for calculating a quantization parameter)

The modes are selected as follows in, e.g., a solid-state electronic still camera. The mode A is used in the continuous photographing mode, and the mode B is used when a predetermined time T or more has not elapsed from previous encoding. In addition, the mode C is used in other cases. In particular, when there is no information of a previous image, e.g., when an encode unit performs first encoding, the mode C is used. In this embodiment, three initial value calculation methods are available. However, the number of modes may be increased or decreased.

Figure 5:
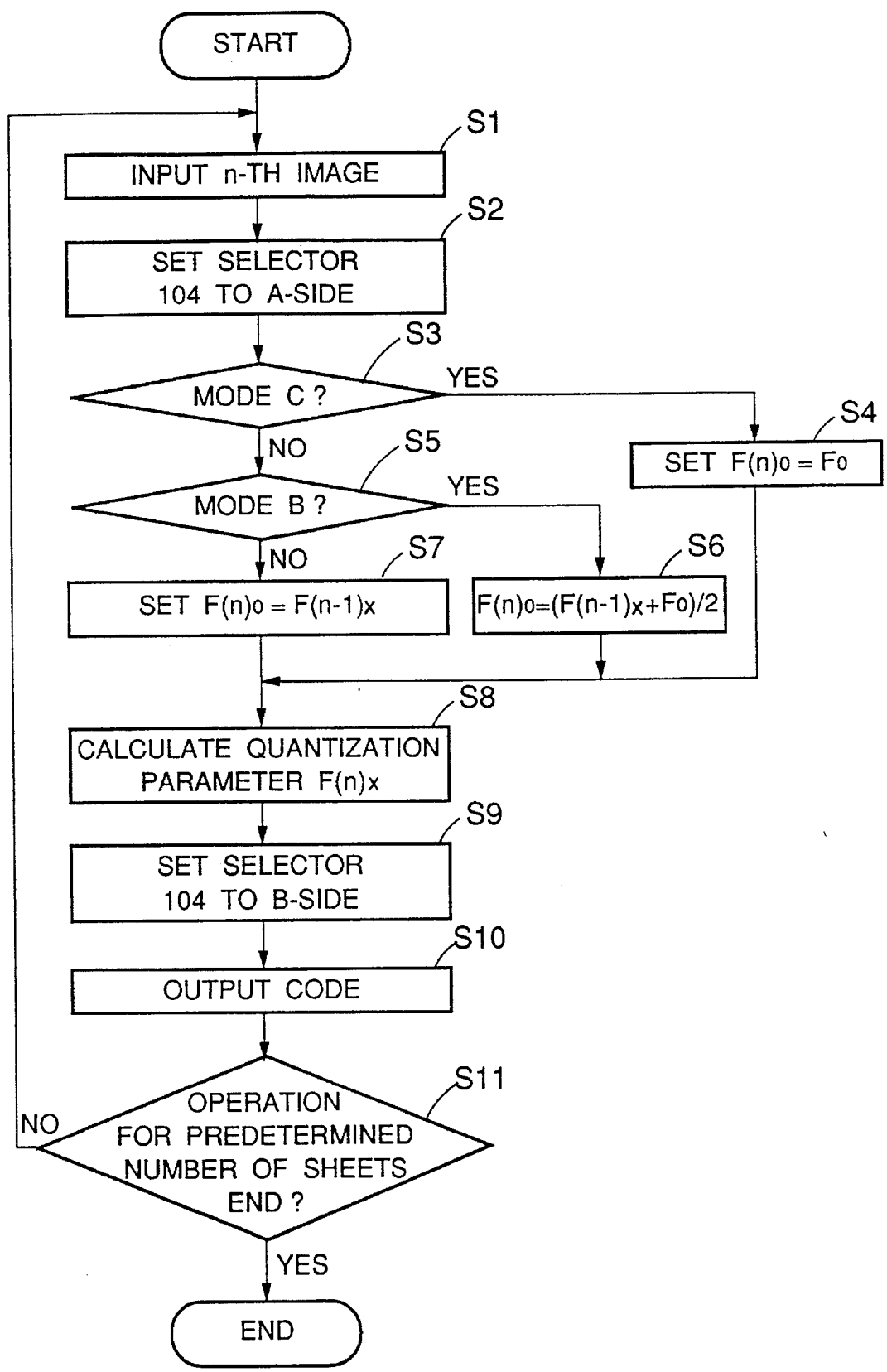
FIG. 5 is a flow chart showing processing according to the first embodiment of the present invention.

FIG. 5 is a flow chart for explaining the operation of the quantization parameter calculation unit 106 described above. In step S1, an n-th image is read out from the frame memory 102, and is encoded by the encode unit 103. In this case, the selector 104 is connected to the A-side (S2). If the mode C is selected (S3), a quantization parameter in first quantization is set to be $F_{(n)0}=F_0$ ($F_0$ is the initial value) (S4). On the other hand, if the mode B is selected (S5), the quantization parameter is set to be $F_{(n)0}=(F_{(n-1)x}+F_0)/2$, i.e., an average value of the initial value $F_0$ and the parameter $F_{(n-1)x}$ of the previous frame (S6). In contrast to this, if the mode A is selected, the quantization parameter is set to be $F_{(n)0}=F_{(n-1)x}$ (S7). Then, a quantization parameter $F_{(n)x}$ having a predetermined code length is calculated using a 10 feedback loop (S8). The selector 104 is connected to the B-side (S9) to output codes (S10). In the continuous photographing mode, the above-mentioned operations are repeated for a predetermined number of sheets (S11).

In this embodiment, the previous image quantization parameter memory unit 107 for storing the quantization parameter is specially arranged. However, since a system for recording compression data on a given recording medium records a value $F_x$ as additional information of the compression data, the value may be read out from the recording medium. The variable-length encode unit may employ orthogonal transform methods other than the DCT, such as the Hadamard transform. The block size is not limited to 8×8 pixels, but may be other sizes. The encode unit need not always employ entropy encoding, but may employ other encoding methods such as vector quantization. If an increase in error of the compression code quantity is permitted, next input image data may be directly encoded using the initial value of the quantization parameter determined according to the present invention without performing repetition by the Newton-Raphson method.

<Second Embodiment>

As one of the ADCT methods, a method of calculating a high-frequency intensity of an image, and 10 estimating a quantization parameter for defining a setup code quantity on the basis of the calculation value is known. In this method, a method which refers to a quantization parameter of a previous image according to the present invention is effective. For example, in a continuous photographing mode of a solid-state electronic still camera, a quantization parameter of only a first image is estimated based on a high-frequency intensity, and can be used for the following images without calculating the high-frequency intensity. Thus, a total processing time can be shortened by a time required for calculating the high-frequency intensity.

In the method of estimating a quantization parameter for defining a predetermined code quantity on the basis of a high-frequency intensity, an estimated value generally has an error. For this reason, estimation based on the high-frequency intensity is required for each quantization. In this case, an average value of an estimated value of a previous image, and an estimated value of a new image to be encoded may be used to allow more precise estimation.

<Third Embodiment>

In the first embodiment, the DCT unit performs the DCT by reading out image data from the frame memory 102 every time encoding is repeated, as shown in FIG. 3. Alternatively, as shown in FIG. 4, a memory unit 305 for storing a transform coefficient after the DCT may be arranged, thus omitting the repetitive DCT operations. As a result, a processing speed can be greatly improved.

<Fourth Embodiment>

In each of the above embodiments, the present invention is applied to a setup operation of a quantization parameter in encoding of a still image. However, the concept of the present invention can be applied to, e.g., an image of a video camera.

Figure 8:
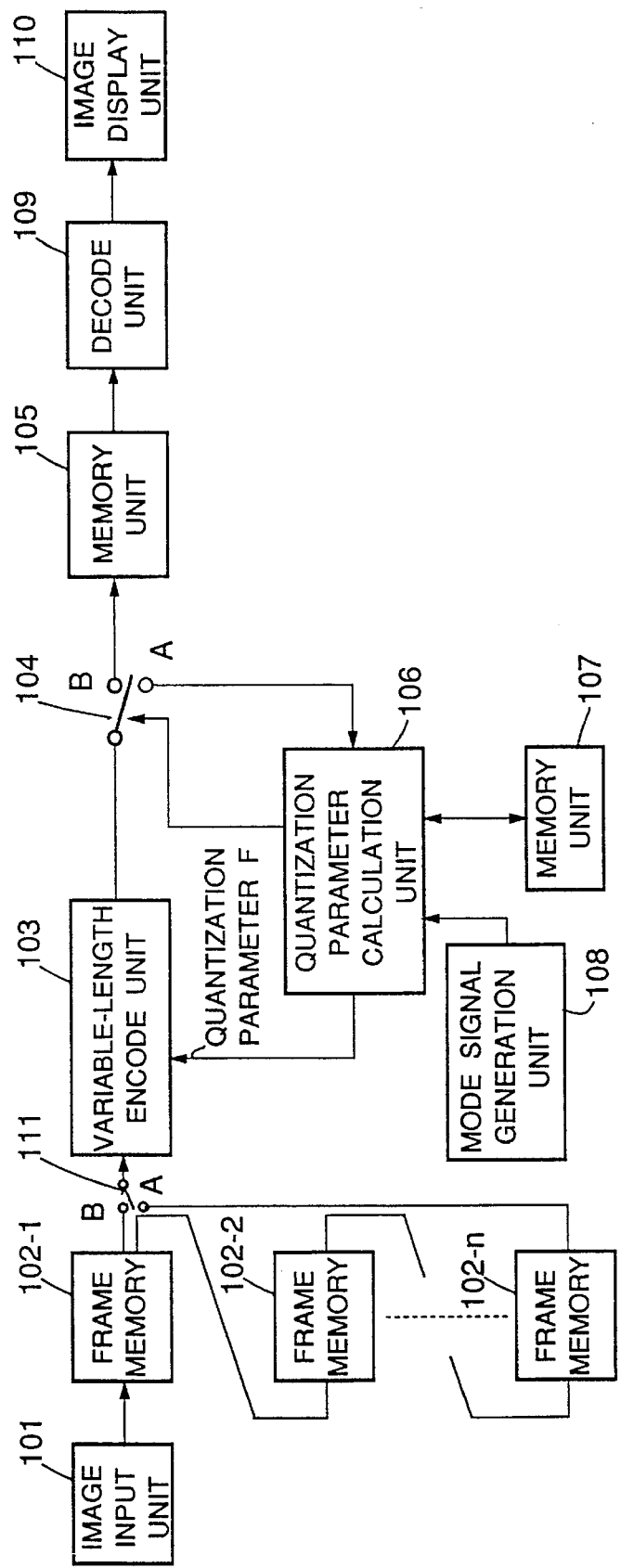
FIG. 8 is a block diagram showing an arrangement of the fourth embodiment of the present invention.

More specifically, when an arrangement shown in FIG. 8 is adopted, an encoding method of the present invention can be applied to a dynamic image (or animation).

In FIG. 8, an image input unit, e.g., a TV camera 101 comprises a CCD area sensor, and is connected to frame memories 102-1 to 102-n used for delaying a dynamic image by a time necessary for an arithmetic operation for setting a quantization parameter.

In the case of a dynamic image, since images for 30 frames (60 fields) are input per second in the NTSC method, the number of input images becomes large as compared to a time for repeating encoding. In order to compensate for the time difference, the arrangement having the plurality of frame memories is employed. The frame memories are connected to a selector 111 for selecting image data. When a first image is input, a B-side is selected. After the quantization parameter of the first image is set, a delayed image at the A-side is used for the second and subsequent images.

In this embodiment, since quantization parameters for the second and subsequent images are calculated on the basis of the quantization parameter of the first image, parameter calculation times of the second and subsequent images can be shortened.

With the above arrangement, the present invention can be applied to encoding in a storage apparatus such as a dynamic image filing system. The type of signal is not limited to NTSC but may be other methods such as PAL, HD, ED, and the like.

<Fifth Embodiment>

The present invention can be applied to an image data transmission apparatus such as a facsimile, as shown in FIG. 9.

In FIG. 9, a transmission unit 112 transmits encoded data to a reception unit 113. The reception unit 113 is connected to a decode unit 114. The decode unit 114 is connected to an image reproduction unit 115 for reproducing a decoded image as a hard copy or a soft copy.

<Sixth Embodiment>

In FIG. 10, the present invention is applied to transmission of dynamic images of, e.g., a video telephone or a television. In FIG. 10, components 101 to 111 are the same as those in FIG. 8, and components 112 to 115 are the same as those in FIG. 9.

Note that each of the first to sixth embodiments can be applied to encoding of a color image. More specifically, the above-mentioned encoding can be performed for various color images including luminance components and chromatic components such as (Y, I, Q), (L*, a*, b*), (L*, u, v), (R, G, S), (Y, M, C), (X, Y, Z), and the like in units of components. In this case, for, e.g., (Y, I, Q) signals, when I and Q sampling widths are increased as compared to that of Y, a compression ratio can be increased, and degradation of image quality is not so visually outstanding.

In each of the above embodiments, a method of setting a quantization parameter to be a proper value has been exemplified. For example, another quantization condition such as quantization bit assignment may be set in accordance with a quantization condition of a frame which is already quantized.

In each of the above embodiments, an image of a previous frame is encoded. However, for the image of the previous frame, only a quantization parameter need only be set. For example, in a still video camera for performing pre-exposure, a quantization parameter may be calculated in the pre-exposure, and encoding may be performed in main exposure based on the parameter or a parameter calculated with reference to the parameter. In this manner, a time required for calculating a quantization parameter in main exposure can be greatly shortened.

As described above, according to the above embodiments, a quantization parameter used for a previously encoded image is referred to determine an initial value of a quantization parameter of an image to be encoded next, so that data can be compressed to a predetermined code quantity by a smaller number of times of repetitions of encoding, i.e., within a shorter time than in a conventional apparatus.

In particular, when the present invention is applied to a solid-state electronic still camera for a still image, high-speed continuous photographing operations can be attained while compressing data to a predetermined code quantity. In addition, since a compression time can be shortened, power consumption can be saved.

Furthermore, each of the above embodiments can be applied to an apparatus for compressing and storing a still image, e.g., an electronic filing system, a copying machine, and the like. In particular, a copying machine which has a plurality of drums in units of colors, and in which distances among the drums cannot be ignored requires image compression, and the present invention is effective.

The present invention is not limited to a still image, but may be applied to a dynamic image of, e.g., a video tape recorder, a video television, or the like.

As described above, according to the present invention, a compression code having a predetermined code quantity can be obtained at high speed.

The present invention is not limited to the above embodiments, and various changes and modifications may be made within the scope of claims.

What is claimed is:

1. An image encoding method comprising the steps of:
   a) successively inputting image data relating to a plurality of different pictures, each of the pictures having a plurality of blocks and each of the blocks having a plurality of pixels;
   b) encoding the image data in units of blocks; and
   c) controlling an encoding parameter in units of pictures such that an amount of encoded image data of each different picture is within a predetermined value, wherein said parameter is determined by using a parameter which has been previously used for encoding a picture preceding a picture to be encoded as an initial parameter, and in the case the previously used encoding parameter does not yield encoded image data within a predetermined value, the image data is repeatedly encoded with a new encoding parameter until an encoding parameter is determined to encode the image data to be within the predetermined value.

2. A method according to claim 1, wherein said images for the plurality of pictures are input by a CCD sensor.

3. A method according to claim 1, wherein said encoding step includes the step of frequency-transforming the images in units of predetermined blocks.

4. A method according to claim 3, wherein said frequency transform is an orthogonal transform.

5. A method according to claim 3, wherein said encoding step includes the step of quantizing a frequency-transformed transform coefficient.

6. A method according to claim 5, wherein said parameter is a parameter associated with the quantizing step.

7. A method according to claim 1, further comprising the step of storing the encoded images for a predetermined number of pictures in a memory.

8. A still video camera comprising:
   a) input means for inputting image data corresponding to a plurality of different pictures at predetermined intervals;
   b) encoding means for sequentially encoding the plurality of different pictures input by said input means; and
   c) control means for determining an encoding parameter of said encoding means such that an amount of encoded image data of each different picture is within a predetermined value, wherein said parameter is determined in accordance with a parameter which has been previously used for encoding a picture that precedes a picture to be encoded, and in the case the previously used encoding parameter does not yield encoded image data within a predetermined value, the image data is repeatedly encoded with a new encoding parameter until an encoding parameter is determined to encode the image data to be within the predetermined value.

9. A camera according to claim 8, wherein said input means comprises a CCD sensor.

10. A camera according to claim 8, wherein said encoding means includes transform means for frequency-transforming the input images in units of predetermined blocks.

11. A camera according to claim 10, wherein said frequency transform is an orthogonal transform.

12. A camera according to claim 10, wherein said encoding means includes quantization means for quantizing a frequency-transformed transform coefficient.

13. A camera according to claim 12, wherein said encoding parameter is a quantization parameter of said quantization means.

14. A camera according to claim 8, further comprising memory means for storing the encoded images for a predetermined number of frames.

15. An image encoding apparatus having a first mode for encoding image data and a second mode for encoding image data which is different from the first mode, comprising:
   a) encoding means for sequentially encoding image data corresponding to a plurality of different pictures; and
   b) selecting means for selecting the first mode for determining an encoding parameter such that an amount of encoded image data of each different picture is within a predetermined value by using a default value, and the second mode for determining an encoding parameter such that an amount of encoded image data of each different picture is within a predetermined value on the basis of a parameter which has been previously used for encoding a picture that precedes a picture to be encoded.

16. An apparatus according to claim 15, wherein said encoding includes transform means for frequency-transforming the input images in units of predetermined blocks.

17. An apparatus according to claim 16, wherein said frequency transform is an orthogonal transform.

18. An apparatus according to claim 16, wherein said encoding means includes quantization means for quantizing a frequency-transformed transform coefficient.

19. An apparatus according to claim 18, wherein said encoding parameter is a quantization parameter of said quantization means.

20. An apparatus according to claim 15, further comprising memory means for storing the encoded images for a predetermined number of pictures.

21. An image processing method comprising the steps of:
a) encoding input image data in accordance with an encoding parameter;
b) measuring an amount of encoded image data;
c) judging whether the amount of encoded image data is within a predetermined amount; and
d) repeating steps a) through c) for the same image data to determine the encoding parameter for said encoding step capable of obtaining said predetermined amount of encoded image data, wherein the encoding parameter is determined by using an encoding parameter which has been previously used for encoding a picture preceding a picture to be encoded as an initial encoding parameter.

22. A method according to claim 21, wherein said encoding step includes the step of frequency-transforming the images in units of predetermined blocks.

23. A method according to claim 22, wherein said frequency transform is an orthogonal transform.

24. A method according to claim 22, wherein said encoding step includes the step of quantizing a frequency-transformed transform coefficient.

25. A method according to claim 24, wherein said parameter is a parameter associated with the quantizing step.

26. A method according to claim 21, further comprising the step of storing the encoded images for a predetermined number of frames in a memory.

27. A method according to claim 21, wherein an encoding parameter of an already encoded image is used as an initial value of the encoding parameter in said encoding step.

28. An image encoding apparatus comprising:
a) input means for inputting image data corresponding to a plurality of different pictures at predetermined intervals;
b) encoding means for sequentially encoding the plurality of different pictures input by said input means;
c) memory means for storing an encoding parameter which has been previously used for encoding a picture preceding a picture to be encoded; and
d) control means for determining an encoding parameter for encoding the picture to be encoded by repeatedly encoding the image data with a different encoding parameter in each encoding until such time an encoding parameter is determined, wherein the encoding parameter stored in said memory means is used as an initial parameter.

29. An apparatus according to claim 28, wherein said input means comprises a CCD sensor.

30. An apparatus according to claim 28, wherein said encoding means includes transform means for frequency-transforming the input images in units of predetermined.

31. An apparatus according to claim 30, wherein said frequency transform is an orthogonal transform.

32. An apparatus according to claim 30, wherein said encoding means includes quantization means for quantizing a frequency-transformed transform coefficient.

33. An apparatus according to claim 32, wherein the encoding parameter is a quantization parameter of said quantization means.

34. An apparatus according to claim 28, further comprising memory means for storing the enclosed images for a predetermined number of frames.

\* \* \* \* \*

UNITED STATES PATENT AND TRADEMARK OFFICE
CERTIFICATE OF CORRECTION

PATENT NO. : 5,517,583

DATED : May 14, 1996

INVENTORS : IZURU HORIUCHI, et al.

It is certified that error appears in the above-identified patent and that said Letters Patent is hereby corrected as shown below:

COLUMN 1

Line 4, "continuation-in-part" should be deleted.

COLUMN 5

Line 24, "10" should be deleted; and
Line 48, "10" should be deleted.

COLUMN 8

Line 42, "frames" should read --pictures--.

COLUMN 9

Line 33, "frames" should read --pictures--.

UNITED STATES PATENT AND TRADEMARK OFFICE
CERTIFICATE OF CORRECTION

PATENT NO. : 5,517,583

DATED : May 14, 1996

INVENTORS : IZURU HORIUCHI, et al.

It is certified that error appears in the above-identified patent and that said Letters Patent is hereby corrected as shown below:

COLUMN 10

Line 23, "predetermined" should read --predetermined blocks--;

Line 33, "enclosed" should read --encoded--; and

Line 34, "frames." should read --pictures.--.

Signed and Sealed this

Twenty-second Day of June, 1999

Attest:

Q. TODD DICKINSON

*Attesting Officer*    *Acting Commissioner of Patents and Trademarks*